Aug. 31, 1965     J. W. GRAY     3,204,119
SIGNAL-TO-NOISE RATIO DETECTOR
Filed Dec. 27, 1961
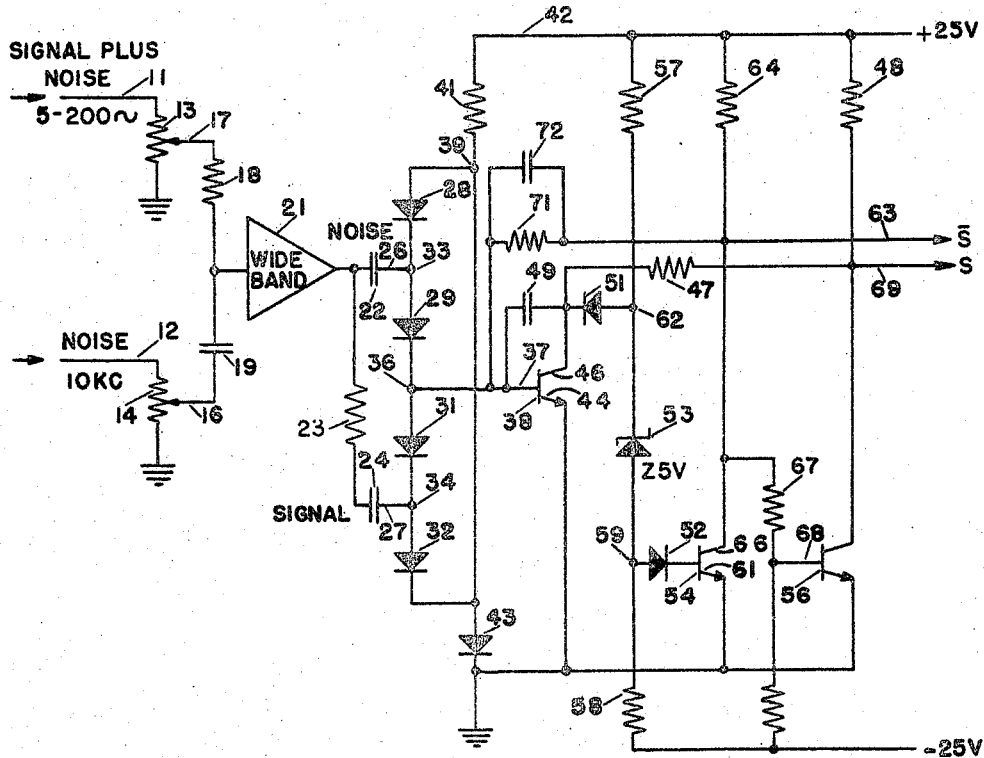
*INVENTOR.*
JOHN W. GRAY
BY
*ATTORNEY*

3,204,119
SIGNAL-TO-NOISE RATIO DETECTOR
John W. Gray, Pleasantville, N.Y., assignor to General Precision, Inc., a corporation of Delaware
Filed Dec. 27, 1961, Ser. No. 162,345
13 Claims. (Cl. 307—88.5)

This invention relates to frequency trackers employed in Doppler aircraft radar systems and particularly to the signal-to-noise ratio detector circuits employed therein.

One type of navigation system employed in aircraft transmits microwave beams toward the earth and, by measuring the Doppler frequencies in the earth echoes received on the aircraft, determines aircraft ground speed, drift angle and dive or climb speed. The component for measuring the Doppler frequencies is termed the frequency tracker.

The Doppler frequency information typically is received in the form of a broad spectrum of frequencies, mixed with noise. The spectrum can be used and measured successfully when its intensity, divided by the noise intensity, is above a certain level. The circuit which determines the ratio of signal amplitude to noise amplitude is termed the signal-to-noise ratio detector, and is a necessary adjunct of the frequency tracker. When the signal-to-noise ratio falls below a selected level of, for example, unity, the signal-to-noise deterctor circuit output operates switches which connect the system in its "memory" mode of operation, "freezing" the existing output indications and starting a frequency sweep to search for a sufficiently strong Doppler signal. When a signal is found having a signal-to-noise ratio above the selected level, the signal-to-noise ratio detector switches operation to the normal mode, stopping the sweep operation and releasing the outputs. The frequency tracker then locks to the Doppler signal, finds its center frequency, and emits a signal representing this center frequency proportional to aircraft ground speed. The frequency tracker also detects misalignment of the antenna with the ground track, emits a signal to the antenna train servomechanism aligning it, and in doing so indicates the drift angle between the ground track direction and the aircraft heading direction. The frequency tracker also detects and measures vertical velocity and emits a signal for use in indicating this quantity.

The present signal-to-noise ratio detector is designed for use in such an aircraft Doppler radar system. The detector receives two signals differing in frequency, one representing the Doppler signal and the other representing noise only. These two signals are at widely different frequencies. They are amplified in a single wideband amplifier to insure equal amplification, then are separated by means of a simple frequency-separation filter. Currents representing the two signals are subtracted to produce a direct current representing, by its sense, the preponderance of signal over noise, or vice versa. This direct current is caused to operate a transistor switch circuit having but two possible output conditions, either fully on or fully off. These output conditions represent the conditions when the signal-to-noise ratio is above or below its minimum value for successful operation of the frequency tracker.

The object of this invention is to provide a signal-to-noise ratio detector for use in a Doppler navigational system.

A further understanding of this invention may be secured from the detailed description and the single schematic drawing of an embodiment of the signal-to-noise ratio detector of the invention.

Referring now to the drawing, a signal including Doppler information and having a frequency range of 5 to 200 c.p.s. is provided at conductor 11 for application to the signal-to-noise detector. This signal also includes noise unavoidably present within this bandwidth. A second signal, consisting of electrical noise only, and having a generally gaussian-shaped spectrum form centered at 10 kcps., is applied at conductor 12. Potentiometers 13 and 14 are provided for adjustment of signal and noise attenuations as desired, thus controlling the threshold or level at which the circuit switches its output from one condition to the other. In general, however, but one of these potentiometers will be required, or an equivalent fixed and tapped resistor. For example, the noise signal input 12 might be connected to the conductor 16 and the potentiometer 14 removed.

The signal and noise in conductors 17 and 16 are combined in a single circuit by use of the coupling resistor 18 and coupling capacitor 19. These inputs, although of such widely different frequencies, are simultaneously amplified in a single wideband amplifier 21 to insure that they undergo equal amplifications.

Such an operation is taught and a suitable amplifier is described in U.S. patent application Serial No. 77,917 of John W. Gray et al., filed December 23, 1960, now patent number 3,061,830.

The amplifier output is separated on a frequency basis by a small series capacitor 22, transmitting principally the noise centered at 10 kc.p.s., and a resistor 23 in series with a large blocking capacitor 24, transmitting principally the Doppler information signal with its associated noise in the band 5 to 200 cps.

The alternating currents in the conductors 26 and 27 are converted into equivalent direct currents and these currents are subtracted by a device consisting principally of four diodes 28, 29, 31 and 32 connected in series aiding in a closed ring. The high frequency branch conductor 26 is connected to the junction 33 of diodes 28 and 29, the low frequency branch conductor 27 is connected to the junction 34 of diodes 31 and 32, and the circuit output is taken from the junction 36 of diodes 29 and 31. The circuit output junction 36 is connected to the base 37 of a transistor 38. The junction 39 of diodes 28 and 32 is connected through resistor 41 to the +25-volt bus 42 and through a diode 43 to ground. The emitter 44 of transistor 38 is grounded and the collector 46 is connected to the +25-volt bus 42 through resistors 47 and 48.

This circuit for converting alternating potentials of diverse frequencies into equivalent direct currents operates as follows. The diode 43 is conductive and sets the potential of junction 39 at about +½ volt. The base 37 of the transistor 38 cannot move far above or below the +½ volt level because of the limiting action of the four diodes and of its own grounded emitter. High frequency currents in the noise branch conductor 26 cause proportional direct current flow in the diodes 28 and 29 toward junction 36. Low frequency current in the signal-plus-noise branch 27 causes proportional direct current flow through the diodes 31 and 32, away from junction 36. Therefore, when alternating currents exist in both branches, if the positive current toward junction 36 due to noise is greater than the positive current away from junction 36 due to signal plus noise, then difference current will flow from the junction 36 into the base 37, increasing the conductivity of the transistor 38. Alternatively, if the signal plus noise current in branch conductor 27 is greater, causing a preponderance of current through diodes 31 and 32 away from junction 36, current is drawn from base 37, causing the transistor 38 to become less conductive. Thus the action is that of a subtracting or difference circuit.

As will be shown, this action at base 37 is highly regenerative, and the effect at the collector 46 of transistor 38 is extremely sensitive to the direction of very small current flows at the base 37, so that the circuit including transistor 38, capacitor 49, diodes 51 and 52, five-volt Zener diode 53, transistors 54 and 56, resistor 71 and capacitor 72 acts like a very sensitive switch.

In the operation of this switch circuit the capacitor 49 connecting the collector 46 to base 37, combined with the transistor 38, constitutes a Miller integrator. Therefore the potential of collector 46 rises continuously and relatively slowly so long as current flows away from the base 37, and the potential of collector 46 decreases so long as current flows toward base 37. Thus a very small potential or current flow rate at the base 37 controls a large potential change at collector 46.

In the absence of load the branch including resistors 57 and 58 and Zener 5-volt diode 53 applies a positive potential to junction 59 which is limited by current flow through diode 52 and grounded emitter 61 to a maximum of +1 volt. The 5-volt drop in the Zener diode 53 then results in a positive potential of no more than +6 volts at junction 62. When, then, current flows into base 37 of transistor 38 due to a preponderance of noise over signal plus noise, the base 37 potential increases relative to the ground potential of the emitter 44, and the transistor 38 becomes more conductive. The potential of its collector 46 accordingly decreases. When the potential decreases below the potential of junction 62 the diode 51 becomes conductive. When the transistor 38 is fully conductive its collector potential is about +1 volt and the diode 51 is completely conductive, and terminal 62 is at about +1½ volts. The junction 59 is thus placed at −3½ volts, making diode 52 and transistor 54 completely nonconductive. The output terminal conductor, 63, if unloaded, then has the +25-volt potential of bus 42 to which it is connected through resistor 64. The connection of collector 66 of transistor 54 through a resistor 67 to the base 68 of transistor 56 causes the latter to be highly conductive, so that the output conductor 69 is grounded through transistor 56 and has a potential near zero.

Thus a small current, measured in microamperes, flowing into base 37 causes a potential difference of about 25 volts between the output conductors 63 and 69, with the former positive relative to the latter.

When current flows away from base 37 due to a preponderance of signal plus noise in the Doppler signal branch conductor 27 over noise in the noise branch conductor 26, the resistance of transistor 38 increases and the collector 46 potential increases toward +25 volts. When it reaches a level of approximately 6½ volts, terminal 62 attains its maximum potential of +6 volts, and diode 51 becomes nonconductive. Diode 52 and transistor 54 then become conductive, and the potential of output conductor 63 falls to near zero. This causes the base 68 of transistor 56 to become negative and the transistor 56 nonconductive, resulting in a potential of +25 volts at the output conductor 69. The resistor 47, which connects collector 46 with conductor 69, then provides the B+ connection to transistor 38, replacing resistor 57 and diode 51, and allowing the collector 46 potential to rise to +25 volts.

Thus a small current flowing out of base 37 causes a potential difference of about 25 volts between the output conductors 63 and 69, with the latter positive relative to the former. This action may be termed turning "on" the output signal, with the relatively positive conductor 69 signal termed "S," indicating that a sufficiently strong Doppler signal is received by the radar system to operate the frequency tracker. When, on the other hand, the output conductor 63 is relatively positive, its signal may be termed "S̄," indicating reception of no Doppler signal or one of insufficient strength.

The speed of the switching operation is greatly accelerated, its action is made more positive, and a locking-in effect is secured by the use of two positive feedback or regenerative paths around the Miller integrator transistor 38. One path is traced from the output conductor 69 through resistor 47 to the collector 46. Another independent path is traced from the output conductor 63 through a resistor 71 shunted by a capacitor 72 to base 37.

The time lag of action on switching from a preponderance of noise to a preponderance of Doppler signal is considerably less than in the reverse switch action from Doppler to noise signal, because in the former case the collector 46 potential changes from about +1 volt to about +6 volts, while in the latter case the change is from +25 volts to less than +6 volts. These voltage differences are translated into time differences by the integrating action provided by condenser 49.

To recapitulate the operation of the complete signal-to-noise ratio detector, a first signal, S+N is received. The frequency is in the band 5 to 200 c.p.s. At the same time a noise signal, N, centered at 10 kc.p.s., is received representing noise only. These first and second signals are applied to the input conductors 11 and 12, respectively. The S+N and N signals are mixed without intermodulation to form a composite signal with a frequency range from 5 c.p.s. to above 10 kc.p.s. This composite signal is amplified in the wideband amplifier 21 with stabilized gain so that all frequencies are amplified equally at all input amplitudes. The composite signal is now separated into its S+N component at 5–200 c.p.s. and its N component at 10 kc.p.s. The potentials of these two components having two frequency ranges are now transformed in a simple circuit of diodes 28, 29, 31 and 32 into two proportional direct currents representing their potentials. The same circuit subtracts these two direct currents and applies the difference current to the input of an integrator comprising transistor 38 and capacitor 49. The sign of this difference current is positive when noise is greater than the Doppler signal and is negative when the Doppler signal is greater than noise. This difference in sign represents the signal-to-noise ratio detector basic measurement. This difference direct current, applied to the integrating transistor 38, causes its output voltage to rise when signal predominates and to fall when noise predominates. These integrator output voltage changes are applied to a switch having an output potential difference representing the S and S̄ conditions. By means of heavily regenerative circuits, the switch transistors are made to behave like infinite amplifiers and to have only the two extreme output conditions, with either output conductor at +25 volts and the other conductor at zero.

The time delay of the integrator when changing from the signal to no signal condition is greater than when changing from the no signal to the signal condition. This prevents interruption of system operation by very short losses of the Doppler signal.

What is claimed is:

1. A signal-to-noise ratio detector comprising, subtracting means having signal and noise quantities applied thereto and producing therefrom an electrical quantity of one sign when signal quantity predominates over noise quantity and of the opposite sign when noise quantity predominates over signal quantity, an integrator means having said electrical quantity impressed on its input and producing an increasing output terminating at an upper level when the electrical quantity is of one sign and a decreasing output terminating at a lower level when the electrical quantity is of the opposite sign, switch means having first and second states of operation, and means interconnecting said integrator and said switch means for operating said switch means to its first state as long as the output of said integrator is above an intermediate level.

2. A signal-to-noise ratio detector as set forth in claim 1 in which said intermediate level is less than the mean of said upper and lower levels.

3. A signal-to-noise ratio detector comprising, subtracting means having signal and noise quantities applied thereto and producing therefrom an electrical quantity of one sign when signal quantity predominates over noise quantity and of the opposite sign when noise quantity predominates over signal quantity, an integrator means having said electrical quantity impressed on its input and adjusted to produce an increasing output terminating at an upper level when the electrical quantity is of said one sign and a decreasing output terminating at a lower level when the electrical quantity is of said other sign, switch means having first and second states of operation, and means interconnecting said integrator and said switch means for maintaining said switch means in the first state as long as the output of said integrator is above a first intermediate level and maintaining said switch means in its second state as long as the output of said integrator is below a second intermediate level less than said first intermediate level.

4. A signal-to-noise ratio detector as set forth in claim 3 in which said first intermediate level is less than the mean of said upper and lower levels.

5. A signal-to-noise ratio detector comprising, a mixing circuit for mixing without modulation, means applying thereto an intelligence signal and a noise signal to form a composite signal, an amplifier amplifying said composite signal, means separating said composite signal into its component intelligence signal and component noise signal, circuit means for generating a difference direct current proportional to the difference of the alternating currents of said intelligence and noise signals, said difference direct current being negative when the intelligence signal current is greater than the noise signal current and positive when less, a Miller integrator having said difference direct current impressed thereon and producing a limited integral potential, and switch means having said limited integral potential impressed thereon and emitting one or the other of a pair of outputs dependent upon the value of the integral potential relative to a reference potential.

6. A signal-to-noise ratio detector comprising, an intelligence signal input terminal, a noise signal input terminal, a mixing circuit connected to said terminals mixing said intelligence signal and said noise signal without modulation to form a composite signal, an amplifier amplifying said composite signal, filter means separating said composite signal into its original components of intelligence signal and noise signal, circuit means having said intelligence signal and said noise signal applied thereto and producing therefrom a difference direct current representing the difference in the potential of said intelligence signal and the potential of said noise signal, a Miller integrator having said difference direct current impressed thereon and producing an integral potential, and switch means operated by said integral potential to produce one or the other of a pair of output signals dependent upon the magnitude of said integral potential relative to a reference potential.

7. A signal-to-noise ratio detector comprising, four diodes connected in series aiding in a closed ring, means for applying an intelligence signal to the junction between a first pair of said diodes, means for applying a noise signal to the junction of said diodes constituting a second pair thereof, a Miller integrator having its input connected to a junction common to said first and second pairs of diodes, means confining the output of said integrator between upper and lower limits, switch means having first and second states of operation, and means interconnecting said integrator and said switch means for operating said switch means to its first state as long as the output of said integrator is above a level intermediate said upper and lower limits.

8. A signal-to-noise ratio detector as set forth in claim 7 in which said intermediate level is less than the mean of said upper and lower limits.

9. A signal-to-noise detector comprising, a first input terminal having an intelligence signal applied thereto, a second input terminal having a noise signal applied thereto, a mixing circuit for combining said intelligence and noise signals to form a composite signal, an amplifier amplifying said composite signal, filter means separating said amplified composite signal into its signal and noise components, a bridge circuit consisting of four diodes connected in series aiding relation in a closed ring, means imposing said signal and noise component output of said filter means on respective ones of one pair of conjugate terminals of said bridge circuit, a diode and a resistor connected in series and across a source of potential supply, the common terminal of said resistor and last mentioned diode being connected to one of the remaining pair of conjugate bridge terminals, a Miller integrator having its input connected to the other of said remaining pair of conjugate bridge terminals, means confining the output of said integrator between upper and lower limits, switch means having first and second states of operation, and means interconnecting said integrator and said switch means for operating said switch means to its first state as long as the output of said integrator is above a level intermediate said upper and lower limits.

10. A signal-to-noise ratio detector as set forth in claim 9 in which said intermediate level is less than the mean of said upper and lower limits.

11. A signal-to-noise detector comprising, first input terminal having an intelligence signal applied thereto, a second input terminal having a noise signal applied thereto, a mixing circuit for combining said intelligence and noise signals to form a composite signal, an amplifier amplifying said composite signal, filter means separating said amplified composite signal into its signal and noise components, a bridge circuit consisting of four diodes connected in series aiding relation in a closed ring, means imposing said signal and noise component outputs of said filter means on respective ones of one pair of conjugate terminals of said bridge circuit, a diode and a resistor connected in series and across a source of potential supply, the common terminal of said resistor and last mentioned diode being connected to one of the remaining pair of conjugate bridge terminals, a Miller integrator having its input connected to the other of said remaining pair of conjugate bridge terminals, means confining the output of said integrator between upper and lower limits, switch means having first and second states of operation, and means interconnecting said integrator and said switch means for maintaining said switch means in its first state as long as the output of said integrator is above a first level intermediate said upper and lower limits and maintaining said switch means in its second state as long as the output of said integrator is below a second intermediate level which is less than said first intermediate level.

12. A signal-to-noise ratio detector as set forth in claim 11 in which said first intermediate level is less than the mean of said upper and lower limits.

13. A signal-to-noise ratio detector comprising, means combining and amplifying signal and noise inputs to form an amplified composite signal, filter means separating said composite signal into its signal and noise components, circuit means having said signal and noise components applied thereto and emitting a direct current having polarity representing the sign of the difference between said signal and noise components, an amplifier shunted by a capacitor constituting an integrator, means applying said direct current to said integrator, means limiting the increasing potential output of said integrator to a first potential value greater than a datum potential, means limiting the decreasing potential output of said integrator to a second potential less than said datum potential, the difference between said first potential and the datum potential being materially greater than the difference between said second potential and the datum potential whereby an integrator input change from a preponderance of signal to a preponderance of noise causes said integrator output to decrease from said first potential to said datum potential in a first period of time, and whereby an integrator input change from a preponderance of noise to a preponderance of signal causes said integrator output to increase from said second potential to said datum potential in a second period of time materially less than said first period of time, electronic switch means operated by said integrator output at said datum potential, said electronic switch means emitting an output representing the direction from which said integrator output potential approaches said datum potential, and regenerate feedback means interconnecting the output of said electronic switch means and said integrator.

References Cited by the Examiner
UNITED STATES PATENTS 3,061,830  10/62  Gray et al. _____ 307—88.5 X JOHN W. HUCKERT, *Primary Examiner.*

ARTHUR GAUSS, *Examiner.*